(12) United States Patent
Fukushima et al.

(10) Patent No.: US 8,674,967 B2
(45) Date of Patent: Mar. 18, 2014

(54) POSITION INDICATOR

(75) Inventors: Yasuyuki Fukushima, Saitama-ken (JP); Hiroyuki Fujitsuka, Saitama-ken (JP)

(73) Assignee: Wacom Co., Ltd., Tokyo (JP)

( * ) Notice: Subject to any disclaimer, the term of this patent is extended or adjusted under 35 U.S.C. 154(b) by 1482 days.

(21) Appl. No.: 12/018,512

(22) Filed: Jan. 23, 2008

(65) Prior Publication Data

US 2008/0180092 A1 Jul. 31, 2008

(30) Foreign Application Priority Data

Jan. 26, 2007 (JP) ................................. 2007-016648

(51) Int. Cl.
 *G01B 7/14* (2006.01)
(52) U.S. Cl.
 USPC ........................................ 345/179; 178/19.03
(58) Field of Classification Search
 CPC ....... G01D 5/208; G01D 5/2417; G01D 5/24; G06F 3/046; G06F 3/03545
 USPC ..................... 345/173–183; 178/18.01–19.05
 See application file for complete search history.

(56) References Cited

U.S. PATENT DOCUMENTS

| | | | | |
|---|---|---|---|---|
| RE34,187 E | * | 3/1993 | Yamanami et al. | 178/18.07 |
| 5,206,785 A | | 4/1993 | Hukashima | |
| 5,576,502 A | * | 11/1996 | Fukushima et al. | 73/862.68 |
| 5,633,471 A | * | 5/1997 | Fukushima | 73/865.4 |
| 6,468,678 B1 | * | 10/2002 | Dahlin et al. | 428/800 |
| 6,853,369 B2 | | 2/2005 | Fukushima et al. | |
| 2003/0122795 A1 | * | 7/2003 | Fujitsuka et al. | 345/173 |
| 2003/0141119 A1 | * | 7/2003 | Chao et al. | 178/19.01 |
| 2003/0156000 A1 | * | 8/2003 | Brunner | 336/96 |
| 2003/0157472 A1 | * | 8/2003 | Castillo et al. | 434/409 |
| 2004/0144575 A1 | * | 7/2004 | Zloter et al. | 178/19.02 |
| 2004/0183643 A1 | | 9/2004 | Brunner | |
| 2005/0028889 A1 | | 2/2005 | Song | |
| 2010/0038152 A1 | * | 2/2010 | Kaneda et al. | 178/18.07 |

FOREIGN PATENT DOCUMENTS

| | | |
|---|---|---|
| EP | 1 154 447 | 11/2001 |
| JP | 2000-13415 | 5/2000 |
| JP | 2001 068324 A | 3/2001 |
| JP | 2001319831 | 11/2001 |
| JP | 2002-22938 | 8/2002 |
| JP | 2002244806 | 8/2002 |
| JP | 2002-28064 | 9/2002 |
| JP | 2004 071845 A | 3/2004 |

* cited by examiner

*Primary Examiner* — Amare Mengistu
*Assistant Examiner* — Vinh Lam
(74) *Attorney, Agent, or Firm* — Berenato & White, LLC

(57) ABSTRACT

A position indicator for use with a digitizer is provided. The position indicator generates a response to an alternating field received from the digitizer. The position indicator includes a core formed of a composition including a soft magnetic metal powder mixed with a resin binder, and at least one coil provided around the core configured to generate the response to the alternating field based on the alternating field received from the digitizer.

8 Claims, 5 Drawing Sheets

POSITION INDICATOR

CROSS REFERENCES TO RELATED APPLICATIONS AND CLAIM TO PRIORITY

The present invention contains subject matter related to Japanese Patent Application JP 2007-016648 filed in the Japanese Patent Office on Jan. 26, 2007, the contents of which are incorporated herein by reference and to which priority is claimed.

FIELD OF THE INVENTION

The present invention relates to a position indicator suitable for use in a digitizer; which may be connected to a computer. Specifically, the present invention relates to a position indicator having a magnetic core with an improved shock resistance and a decreased diameter of the magnetic core that is easy to manufacture.

BACKGROUND OF THE INVENTION

A pen-shaped position indicator generally includes a resonant coil for detecting a position. The resonant coil is arranged in the vicinity of the tip of the pen shape (e.g., see Japanese Unexamined Patent Application Publication No. 2001-319831). However, a magnetic core of the position indicator, around which the resonant coil is wound, may be damaged by impact when the position indicator is dropped or falls.

Because the magnetic core utilized in prior position indicator(s) is formed of soft magnetic molded metal product, it is usually fragile against impact. In the prior position indicators, a buffer material is typically provided around the resonant coil and core. The buffer material results in an increase in the number of components and an increase in a diameter of the magnetic core of the position indicator.

An increased number of position indicators have recently been utilized in compact mobile information terminals such as PDAs (Personal Digital Assistant). The position indicator of the compact mobile information terminal preferably has a thin, compact diameter. For example, in certain PDA's, the position indicator is required to be sufficiently thin so as to be housed in the PDA. It is possible to form an indicator having a small diameter with materials used in the prior devices; however, the strength of the material of the indicator decreases as the thickness thereof decreases. Thus, the position indicator may not be strong enough to withstand the impact when it is dropped or when the position indicator is forced against a surface by a user's hand. As a result, the position indicator may bend or the magnetic core thereof may be broken.

Accordingly, there is a need for a compact position indicator having an impact resistant magnetic core.

SUMMARY OF THE INVENTION

The present invention provides a magnetic core for a position indicator having a high shock resistance when the indicator is impacted, such as when it fall or is dropped. More specifically, according to the present invention, the probability of damaging the magnetic core may be lowered. Thus, the position indicator can be simply configured without a buffer material around the core, and a shaft diameter of the position indicator can be reduced.

The present invention provides a position indicator for use with a digitizer. The position indicator generates a response to an alternating field received from the digitizer. The position indicator includes a core formed of a composition including a soft magnetic metal powder mixed with a resin binder, and at least one coil provided around the core. The coil is configured to generate the response to the alternating field based on the alternating field received from the digitizer.

The present invention also provides a position indicator for use with a digitizer. The position indicator generates a response to an alternating field received from the digitizer. The position indicator includes a core formed of a composition including a soft magnetic metal powder mixed with a resin binder, and a resonant coil provided around the core. The resonant coil is configured to be excited based on the alternating field received from the digitizer and to generate the response to the alternating field. A variable capacitance configured to detect a pen pressure when the position indicator is pressed against a surface of a digitizer, and a control circuit is configured to control the excitation of the resonant coil based on a capacitance value of the variable capacitance.

The position indicator has a pen shape, and the core is provided in the vicinity of a tip of the pen shape.

The position indicator may further include an outer housing having a pen shape. The core has a shape that corresponds to an inner surface of the outer housing.

A core stem having a tip at one end thereof may be provided to penetrate through the core.

The soft magnetic metal powder may include 25 to 65 vol % of a flat soft magnetic metal powder employing iron (Fe) as a master alloy.

The composition formed of the flat soft magnetic metal powder is produced by injection compression molding where the soft magnetic metal powder is caused to align in a predetermined direction using an injection compression molding device.

The present invention also provides a digitizer device including a position indicator. The position indicator includes a housing and an elongated magnetic core disposed in the housing. The magnetic core has an elongated hole extending axially therethrough, and the magnetic core includes a composition of soft magnetic metal powder mixed with a binder resin. A core stem extends through the elongated hole. The core stem has a pen tip extending from the magnetic core at a first end and a conductive elastic member extending from the magnetic core at a second end opposite to the first end. The core stem is movable with respect to the housing. A resonant coil is wound around the magnetic core for electromagnetic communication. A variable capacitance is operably associated with the conductive elastic member. The variable capacitance includes a dielectric element, a first electrode disposed on a first surface of the dielectric element, and a second electrode disposed on a second surface of the dielectric element opposite to the first electrode. The elastic conductive member changes an area of the variable capacitance when forced into contact with the dielectric element.

The present invention also provides a magnetic core injection molding device. The magnetic core injection molding device includes a mold defining an inner cavity receiving a melted composition of soft magnetic metal powder and an organic binder resin. The mold includes an elongated major surface of the inner cavity forming a major outer surface of a magnetic core. The major surface defines a first opening having a first dimension at a first end of the inner cavity. A minor surface of the inner cavity extends from the major surface and is angled with respect thereto. The minor surface is gradually tapered to form a semi-conical or pointed minor outer surface of the magnetic core. The minor surface defines a second opening having a second dimension at a second end of the inner cavity. The second dimension is smaller than the first dimension.

The present invention also provides a method of manufacturing a magnetic core for a position indicator of a digitizer tablet. The method includes the steps of mixing soft magnetic metal particles with a binder resin in a hopper to form a composition, and melting the composition and injecting the composition into a mold defining an inner cavity. The composition is molded into a solid magnetic core having the shape of an inner cavity of the mold by applying the composition to a major surface of the inner cavity and to a minor surface of the inner cavity extending from said major surface at an angle so that the composition forms a main elongated portion corresponding to the major surface of the inner cavity and a tapered, semi-conical portion corresponding to the minor surface of the inner cavity.

DESCRIPTION OF THE PREFERRED EMBODIMENT(S)

Figure 1:
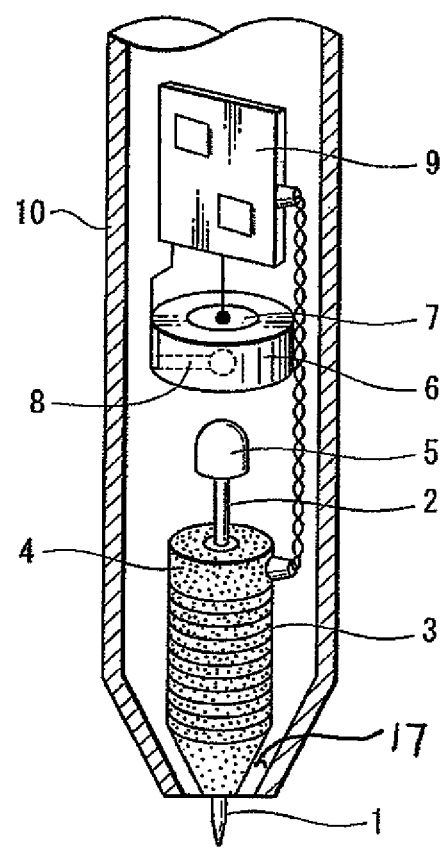
FIG. 1 is a fragmentary cross-sectional view of a position indicator according to an embodiment of the present invention.

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification.

Japanese Unexamined Patent Application Publication No. 2004-71845 describes a technique used to produce a core of a magnetic device. In this technique, a flat soft magnetic metal powder is mixed with an organic binder to form a core of the magnetic device by injection molding. The technique increases the molding flexibility. Due to the resin mixed therein, the core formed by this technique is increasingly resistant to impacts.

As best shown in FIG. 1, a position indicator includes a core stem 2 having a pen tip 1 at one end thereof arranged so as to penetrate through a magnetic core 4. The position indicator further includes a position detecting coil 3 (also referred to herein as a "resonant coil") which is a conductive line wound around the magnetic core 4. The magnetic core 4 is molded with a composition obtained by mixing soft magnetic metal powder with an organic binder. The sensitivity of the position detecting coil 3 is improved by having the coil wound around the magnetic core 4.

Figure 2:
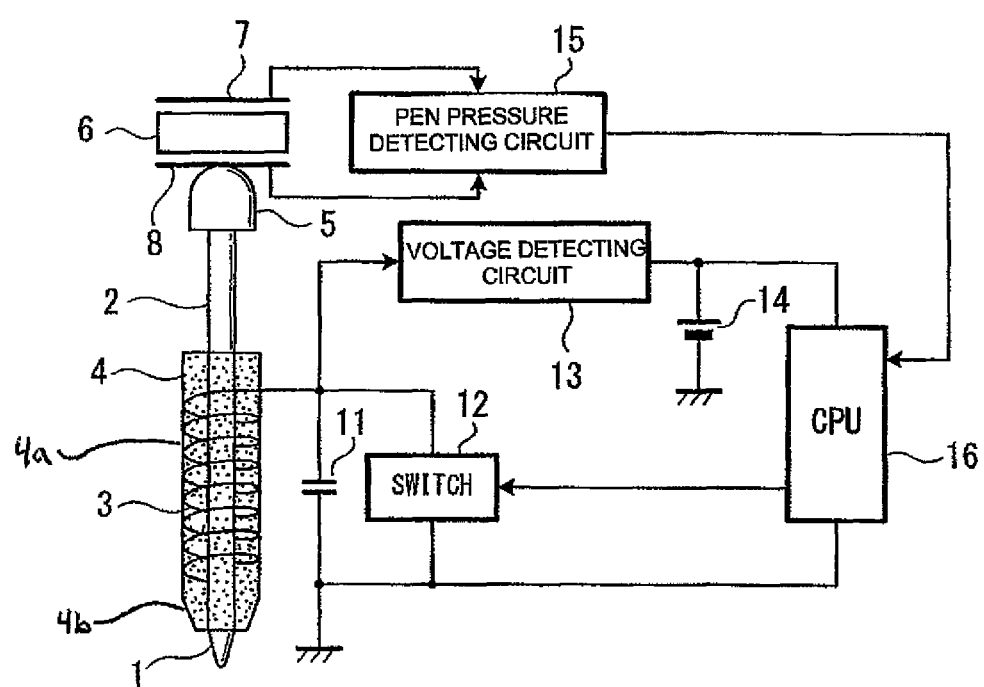
FIG. 2 is a schematic diagram illustrating the position indicator of FIG. 1.

A conductive elastic member 5 having a dome shape is provided at the other end of the core stem 2 opposite the tip 1. As best shown in FIGS. 1 and 2, the magnetic core 4 includes an elongated hole for accommodating the core stem 2. FIG. 2 shows the core stem 2 extending through the elongated hole of the magnetic core 4. A dielectric disc 6 having a flat shape is provided in the vicinity of the conductive elastic member 5. An electrode 7 is provided on a first surface of the dielectric disc 6 while a lead electrode 8 is provided on a second surface of the dielectric disc 6 opposite to the electrode 7. The dielectric disc 6 is arranged such that the second surface thereof faces the conductive elastic member 5. Due to this arrangement, the conductive elastic member 5 can be selectively pressed into contact with the dielectric disc 6 based on pressure applied to the tip 1.

The lead electrode 8 on the second surface of the dielectric disc 6 extends along the center of the second surface of the dielectric disc 6 via a side surface of the dielectric disc 6. Lead lines from the electrodes 7 and 8 are connected to a circuit board 9. Lead lines from the position detecting coil 3 are also connected to the circuit board 9. An outer housing 10 contains the components of the position indicator described above. Because the magnetic core 4 is resistant to impact and shocks, no buffer material is necessary around the core 4 and the coil 3 to protect these elements from damage. As a result, the core 4 may be made to fit relatively tightly inside the outer housing 10 such that an air interface 17 defines a boundary between an inner surface of the outer housing 10 and an outer surface of the material of the core 4. The air interface 17 may extend continuously between these elements without interruption except for the coil 3.

According to the present embodiment, when pressure is applied to the pen tip 1, the conductive elastic member 5 is pressed against the second surface of the dielectric disc 6 and hence the peak of the conductive elastic member 5 is flattened, thereby increasing a contact area of the second surface of the dielectric disc 6 and the effective area of a capacitor formed across the dielectric disc 6. A capacitance value obtained between the electrode 7 and the lead electrode 8 changes with the size of the contact area between the second surface of the dielectric disc 6 and the peak of the conductive elastic member 5, which is forced into contact with the lead electrode 8.

In this manner, a value of the pressure applied to the pen tip 1 is detected based on the change in the capacitance value between the electrode 7 and the lead electrode 8. The change in the capacitance value is detected and processed, for example, by circuits shown in FIG. 2 that are provided on the circuit board 9.

As best shown in FIG. 2, the core stem 2 has the pen tip 1 at one end thereof so as to penetrate through the magnetic core 4. The position detecting coil 3 is a conductive line wound around the magnetic core 4. The conductive elastic member 5 is disposed at the other end of the core stem 2, and the dielectric disc 6 having the electrode 7 and the lead electrode 8 is positioned in the vicinity of the conductive elastic member 5. A resonant capacitor 11 is arranged in parallel with and connected to the position detecting coil 3. A switch 12 is located between and connected to both ends of the resonant capacitor 11. One end of the position detecting coil 3 is connected to a storage battery 14 via a voltage detecting circuit 13.

The lead lines extending from the electrode 7 and the lead electrode 8 are connected to a pen pressure detecting circuit 15. The pen pressure detecting circuit 15 detects the change in the capacitance value between the electrode 7 and the lead electrode 8 in the manner described above. The change in the capacitance value obtained is detected as a predetermined value of the pen pressure applied by pressing the core stem 2 against a surface, such as a digitizer. The resulting value of the pen pressure is supplied to a Central Processing Unit (CPU) 16. A signal generated by the CPU 16 based on the pen pressure is supplied to the switch 12, which is switched on or off to transmit a signal including the value of the pen pressure.

Power stored in the storage battery 14 is supplied to the CPU 16 and the other components in the position indicator to drive the components of the position indicator. Thus, since the position indicator can be driven by the driving power, which is accumulated from the position detecting coil 3 in the storage battery 14, i.e., without a power supply via a wired line or a dry battery, the position indicator can be powered wirelessly by transmissions from the digitizer. As a result, the position indicator is easy to handle. This power supply also enables the position indicator of the embodiment to perform more powerful signal transmissions to the digitizer.

A variable capacitance utilized as a pen pressure detector has a simple configuration including the core stem 2 having the dome shaped conductive elastic member 5, and the flat dielectric disc 6 having the electrode 7 on the first surface and the lead electrode 8 on the second surface thereof. Examples of the conductive elastic member 5 include silicon conductive rubber and pressure sensitive conductive rubber.

In the present embodiment, a soft magnetic metal powder is mixed with an organic resin binder, and the magnetic core 4 is formed from the resulting composition, for example, by injection molding. The material used is easier to form than the soft magnetic metal of the prior art. In addition, since the magnetic core 4 exhibits excellent shock resistance in comparison to the soft magnetic metal of the prior art, the probability of damaging the magnetic core 4 can be minimized. Accordingly the position indicator of the present embodiment can be simply configured without providing a buffer material around the core. Additionally, a shaft diameter of the position indicator can be minimized.

Figure 3:
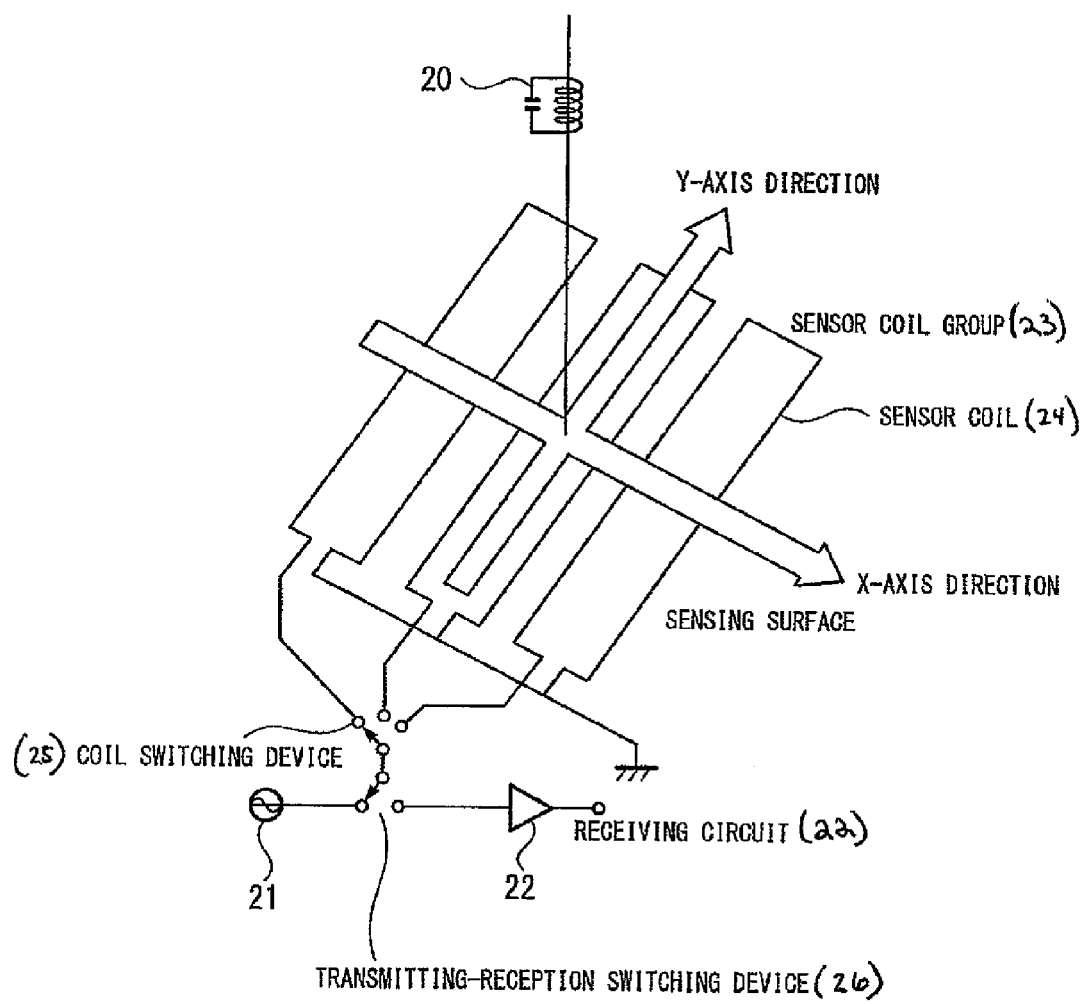
FIG. 3 is a schematic diagram illustrating a coordinate input device according to an embodiment of the present invention.

FIG. 3 is a schematic configuration illustrating a coordinate input device having a cordless position indicator 20. The position indicator 20 may be similar, or the same as, the position indicator shown in FIGS. 1 and 2. The coordinate input device employs an electromagnetic transmission-reception system. The coordinate input device includes a plurality of sensor coil groups 23 positioned in parallel with X-axis and Y-axis directions. Each sensor coil group 23 includes a plurality of sensor coils 24.

In the coordinate input device, current is caused to flow in the sensor coil 24 during transmission, i.e., when the coordinate input device is in the transmission mode. In turn, an alternating field is then transmitted from the coil 24. The transmitted alternating field, also known as an excitation signal, excites a coil or a resonant circuit in the position indicator 20, thereby causing the position indicator 20 to generate a response to the alternating field, also known as a position indicating signal. When the coordinate input device switches from the transmission mode to the reception mode, the transmission of the alternating field from the sensor coil 24 is stopped, thereby causing to the sensor coil 24 to receive the response to the alternating field from the position indicator 20. Intensity distribution of the received signal obtained from each of the sensor coils 24 is then subject to a signal analysis, thereby determining a coordinate of the position indicator 20.

The current caused to flow in the sensor coil 24 during the transmission mode may include a high-frequency signal. A high-frequency signal generator 21 is employed to generate the high-frequency signal. The coordinate input device further includes a coil switching device 25 selecting each of the sensor coils 24 for transmitting the high-frequency signal from the high frequency generator 21 or receiving the response signal from the position indicator 20. The coordinate input device still further includes a transmission-reception switching device 26 for switching the sensor coils 24 between the transmission mode or the reception mode. The coil switching device 25 and the transmission-reception switching device 26 may either be provided independently or in combination with one another. The received response signal is provided to a signal analyzing unit (not shown) via a receiving circuit 22, so that a coordinate of the position indicator 20 with respect to the coordinate input device can be determined.

Figure 4:
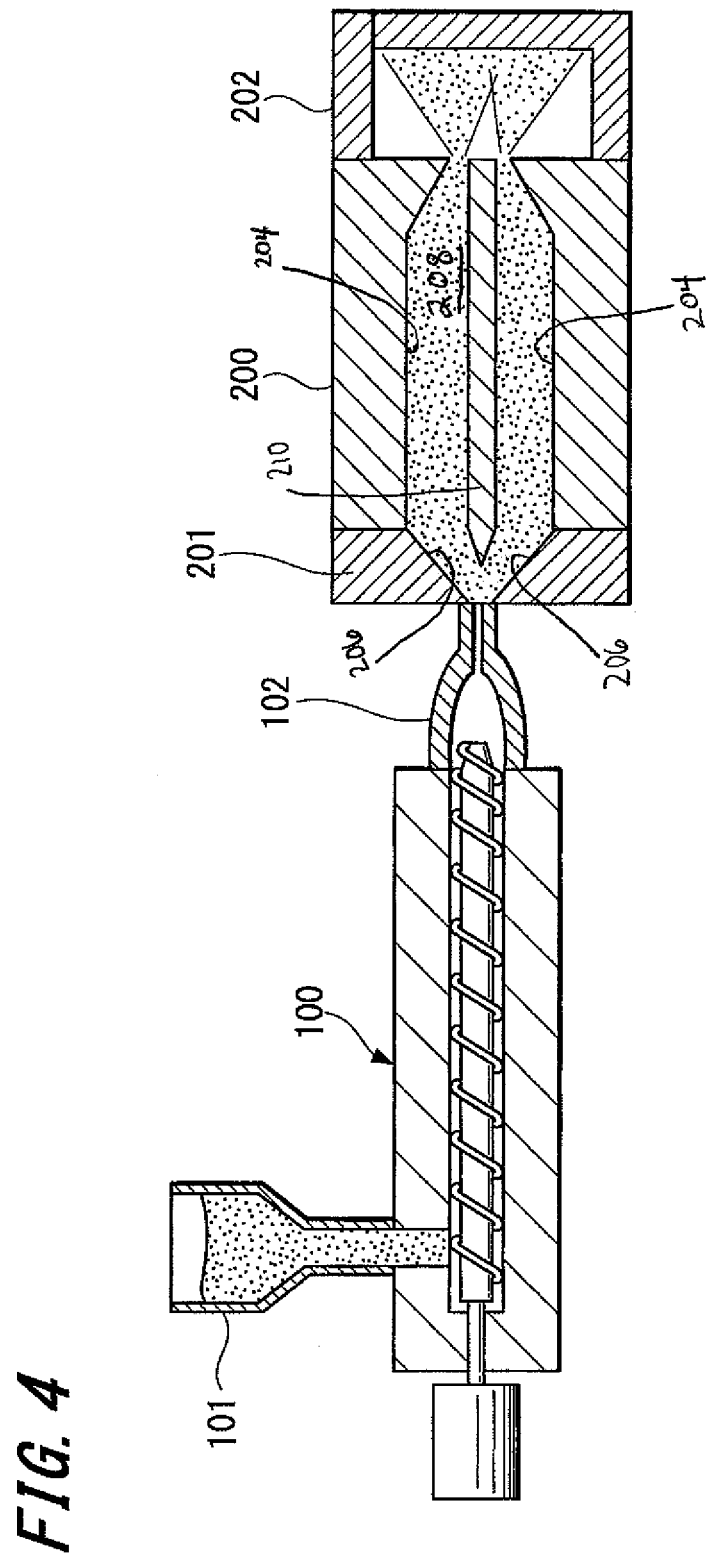
FIG. 4 is a schematic diagram illustrating a device used for producing a magnetic core of a position indicator according to another embodiment of the present invention.

FIG. 4 is a schematic configuration illustrating a device used for forming the magnetic core 4 by injection molding. As best shown in FIG. 4, a composition is obtained by mixing the soft magnetic metal powder with a binder, such as an organic resin in a hopper 101. The composition is then supplied to an injector 100. The injector 100 includes a heat source that melts the composition. The resulting melted composition is then injected from an injecting nozzle 102 into a mold 200. Preferably, the soft magnetic metal used for the powder is selected from a group including Carbonyl Iron, an Fe—Si alloy, or a Fe—Co alloy, and the binder is selected from a group including a polyamide binder, a polyester binder, and a polycarbonate binder.

The mold 200 is formed to have a shape that corresponds to an inner surface of the outer housing 10 of the position indicator best shown in FIG. 1. Accordingly, the magnetic core 4 formed thereby has a shape that closely approximates the inner surface of the outer housing 10. One end of the mold 200 is connected to the injection nozzle 102 via a connecting unit 201 while the other end of the mold 200 includes a discharging unit 202 having a void into which part of the melted composition is discharged. The melted composition injected from the injecting nozzle 102 is filled in the mold 200 and part of the injected composition is then discharged into the discharging unit 202.

The mold 200 has a major inner surface 204 and a minor inner surface 206 that extend therefrom. The surfaces 204 and 206 define an inner cavity 208. The major inner surface 204 extends along in parallel with a predetermined axis (not shown), while the minor inner surface 206 extends at an angle from the major inner surface 204 not in parallel with the predetermined axis. The major inner surface 204 forms a cylindrical main portion 4a of the magnetic core 4 shown in FIGS. 1 and 2, and the minor inner surface 206 forms a semi-conical tip portion 4b that extends from the cylindrical main portion 4a of the magnetic core 4 as best shown in FIG. 2. As best shown in FIG. 4, an elongated bar 210 extends along the major inner surface 204 and the minor inner surface 206 to form an elongated hole in the magnetic core 4 through which the core stem 2 extends.

The aforementioned soft magnetic metal powder includes 25 to 65 vol % of the flat soft magnetic metal powder employing iron (Fe) as a master alloy. The magnetic core 4 made of this composition exhibits excellent strength and shock resistance so that the magnetic core 4 may not easily be broken. Since the composition made of the soft magnetic metal powder is solidified using a resin binder, the magnetic permeability of the composition is significantly reduced. However, the magnetic permeability of the composition can be improved by causing the flat soft magnetic metal powder to align in a predetermined direction using the aforementioned injection compression molding device best shown in FIG. 4. The flat soft magnetic metal powder may be aligned in the predetermined direction by applying a magnetic field during the molding process.

Specifically, the formed magnetic core 4 is solidified with the soft magnetic metal powder thereof being aligned approximately in the predetermined direction, thereby obtaining a product having excellent properties. Further, since the shape of the magnetic core 4 corresponds approximately to the shape of the inner surface of the outer housing 10 shown in FIG. 1, the tip of the magnetic core 4 can be located close to the pen tip 1 of the position indicator. Moreover, since the magnetic field generated from the sensor coils 24 shown in FIG. 3 can quickly be detected, accuracy in the position detection can also be improved.

Figure 5:
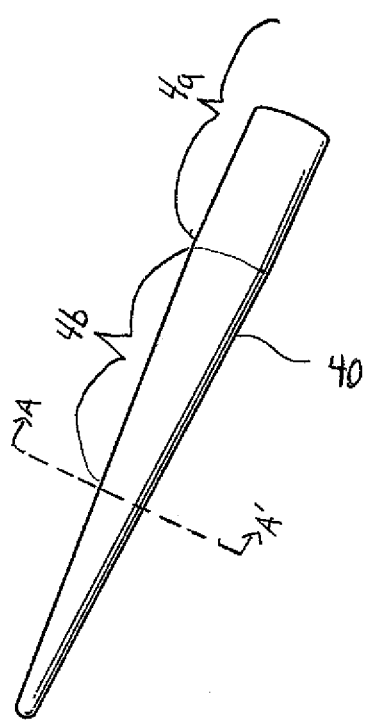
FIG. 5 is a plan view illustrating a magnetic core formed by the device of FIG. 4, according to yet another embodiment of the present invention.

Accordingly the core 4 formed by injection molding exhibits excellent shock resistance in comparison to that made of the soft magnetic metal by the technique of the prior art. Consequently, the probability of damaging the core 4, around which the resonant coil 3 for the position indicator is wound, may be minimized. Thus, the position indicator can be simply configured without providing a buffer material around the core, and the shaft diameter of the position indicator can be reduced. FIG. 5 is an external view illustrating a molded magnetic composition 40 which has been removed from the mold 200 best shown in FIG. 4. Once the molded magnetic composition 40 is removed from the mold 200 the magnetic core 4 is formed by cutting the molded magnetic composition 40 along line A-A' as best shown in FIG. 5. The molded magnetic composition 40 includes an elongated hole extending lengthwise therein which was defined by the elongated bar 210 during the molding process, as described above. The molded magnetic composition 40 also includes the semiconical tip portion 4b and the cylindrical main portion 4a which were defined by the minor inner surface 206 and the major inner surface 204 of the mold 200, respectively. Accordingly, the magnetic core 4 is formed.

Although embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A digitizer device, comprising:
a position indicator, including:
a housing;
an elongated magnetic core disposed in said housing, said magnetic core having an elongated hole extending therethrough, and said magnetic core comprising a composition of soft magnetic metal powder mixed with a binder resin;
a core stem extending through said elongated hole, said core stem having a pen tip extending from said magnetic core at a first end and a conductive elastic member extending from said magnetic core at a second end opposite to said first end, and said core stem being movable with respect to said housing;
a resonant coil wound around said magnetic core for electromagnetic communication; and
a variable capacitance operably associated with said conductive elastic member, said variable capacitance comprising a dielectric element, a first electrode disposed on a first surface of said dielectric element, and a second electrode disposed on a second surface of said dielectric element opposite to said first electrode,
wherein said elastic conductive member changes an area of the variable capacitance when forced into contact with said dielectric element.

2. A digitizer device according to claim 1, further comprising:
a digitizer tablet comprising a plurality of sensor coils arranged in an array, said sensor coils transmitting and receiving signals to and from said resonant coil of said position indicator.

3. A digitizer device according to claim 1, further comprising:
an air interface extending continuously between an outer surface of the magnetic core and an inner surface of the outer housing.

4. A digitizer device according to claim 1, further comprising:
a control circuit for controlling internal components of said position indicator; and
a storage battery being charged when an electric current is induced on said resonant coil by an external magnetic field, said storage battery driving said control circuit and said internal components thereby operating said position indicator wirelessly and without an external power supply.

5. A digitizer device, comprising:
a position indicator, including:
a housing;
an elongated magnetic core disposed in said housing, said magnetic core having an elongated hole extending therethrough, and said magnetic core comprising a composition of soft magnetic metal powder mixed with a binder resin;
a core stem extending through said elongated hole, said core stem having a pen tip extending from said magnetic core at a first end and a conductive elastic member extending from said magnetic core at a second end opposite to said first end, and said core stem being movable with respect to said housing;
a resonant coil wound around said magnetic core for electromagnetic communication; and
a variable capacitance operably associated with said conductive elastic member, said variable capacitance comprising a dielectric element, a first electrode disposed on a first surface of said dielectric element, and a second electrode extending along a side of said dielectric element toward a circuit board and being in electrically connected to said elastic conductive member when a force is applied to said pen tip,
wherein said elastic conductive member changes an area of the variable capacitance when forced into contact with said dielectric element.

6. A digitizer device according to claim 5, further comprising:
a digitizer tablet comprising a plurality of sensor coils arranged in an array, said sensor coils transmitting and receiving signals to and from said resonant coil of said position indicator.

7. A digitizer device according to claim 5, further comprising:
an air interface extending continuously between an outer surface of the magnetic core
and an inner surface of the outer housing.

8. A digitizer device according to claim 5, further comprising:
a control circuit for controlling internal components of said position indicator; and a storage battery being charged when an electric current is induced on said resonant coil by an external magnetic field, said storage battery driving said control circuit and said internal components thereby operating said position indicator wirelessly and without an external power supply.

* * * * *